United States Patent [19]
Wade

[11] Patent Number: 6,063,019
[45] Date of Patent: May 16, 2000

[54] CENTRIFUGE WITH ROTATABLE TUBE FOR PARTICLE AND FLUID SEPARATION

[76] Inventor: Brian Wade, Verts Pres, Les Caches, St. Martin, Guernsey, United Kingdom

[21] Appl. No.: 08/973,230

[22] PCT Filed: Jun. 3, 1996

[86] PCT No.: PCT/GB96/01313

§ 371 Date: Dec. 3, 1997

§ 102(e) Date: Dec. 3, 1997

[87] PCT Pub. No.: WO96/39254

PCT Pub. Date: Dec. 12, 1996

[30] Foreign Application Priority Data

Jun. 3, 1995 [GB] United Kingdom .................... 9511254
Jun. 3, 1995 [GB] United Kingdom .................... 9511255

[51] Int. Cl.$^7$ ............................. B04B 15/02; B01D 45/12
[52] U.S. Cl. ............................... 494/14; 494/64; 494/83; 494/900; 494/24; 55/406; 55/408
[58] Field of Search ................................ 494/13, 14, 24, 494/49, 56, 60, 64, 83, 900; 55/406, 408, 409

[56] References Cited

U.S. PATENT DOCUMENTS 3,506,314  4/1970  Gross et al. .
5,163,986  11/1992  Bielefddt .

FOREIGN PATENT DOCUMENTS 1325893   3/1963   France .
2414368   8/1979   France .
1113909   5/1962   Germany .
1191750   4/1965   Germany .
2529779   8/1976   Germany .
2920096   11/1980  Germany .
9415521   2/1995   Germany .
879118    10/1961  United Kingdom .
2004776   4/1979   United Kingdom .
2176719   1/1987   United Kingdom .

OTHER PUBLICATIONS

Licht, L. (1972) ASME Transactions 94:211–22.
Martin, H. (1959) Chemie–Ingenieur–Technik 31:73–132 (with English translation).

*Primary Examiner*—W. L. Walker
*Assistant Examiner*—Terry K. Cecil
*Attorney, Agent, or Firm*—Klauber & Jackson

[57] ABSTRACT

A centrifuge including a non-rotatable containment vessel, a rotatable centrifuge tube within said vessel, an inlet assembly for dirty gas, an outlet assembly for clean gas, and an outlet assembly for dirty gas, said inlet assembly for the dirty gas and said outlet assembly for the dirty gas being located in close mutual proximity and at or towards one end of the centrifuge tube, the outlet for the clean gas being located at the opposite end of the centrufuge tube, the flow of gas entering the centrifuge tube being reversed within the centrifuge tube so as to increase the residence time of the dirty gas within said centrifuge tube. The centrifuge tube is supported on spaced foil bearings located at predetermined spacings relative to each other and to the ends and center of the centfrifuge tube.

16 Claims, 8 Drawing Sheets

CENTRIFUGE WITH ROTATABLE TUBE FOR PARTICLE AND FLUID SEPARATION

This invention relates to particle and light and heavy fluid separators, and more particularly to fluid and particle centrifuges for removing or separating elements suspended in a gaseous, liquid or solid medium and various combinations thereof.

Centrifuges or, as they are often and sometimes called, cyclones are devices for separating or removing elements suspended in a gaseous, liquid, or solid medium and various combinations thereof, to be generally referred to herein as fluids. Thus centrifuges can be used to separate gases from gases, liquids from liquids, gases from liquids and particulate matter from gases and liquids, as well as particulate matter from particulate matter.

The centrifuge may use various carrier materials such as gas, liquids, solids, or a combination of any of these and in any order to provide different molecular weights in the materials to be separated.

Some suggested applications of centrifuges are the clean up of VOC in the printing and packaging industries, the clean up of water and re-usable water, and the desalination of water, clean room technology as an alternative to full filter systems, high speed power generation, recovery of printing fluids, and many others.

There have been many proposals for centrifuges, and of particular interest in connection with the present invention are the prior proposals in DE-A-2920096, DE-U-9415521, GB-A-2176719, ASME Transactions (Volume 94, No 3—pp211–222), DE-A-2529779, Chemie-Ingenieur-Technik Volume 31, No 2—p75), GB-A-879118, FR-A-2414368, and FR-A-1325893.

The disclosures in the above-mentioned prior art references disclose several and varied aspects relating to centrifuges, but they do not achieve the object of the present invention.

The residence or dwell time of the fluids, solids or fluids and solids in the centrifuge has an effect on the degree of separation achieved, and the present invention is, inter alia, concerned with this aspect of a centrifuge.

Centrifuges incoporate a shaft in the form of a centrifuge tube which is rotated, during operation of the centrifuge, at very high speeds in order to achieve the required degree of separation in the material(s) being treated. The centrifuge tube, supported for rotation in bearings, has a tendency to vibrate at its natural frequency or 'first whorl frequency', and where such frequency is below the desired operational rotational speed of the centrifuge tube, there can be problems in reaching this operational speed without causing damage to the shaft and/or other parts of the centrifuge.

Foil bearings have been used to support the centrifuge tube, see for example the above-mentioned prior art reference ASME Transactions, such bearings being located at either side of a centrally located turbine used to drive the centrifuge tube, and whilst the use of these bearings has in general been found to be satisfactory, there are still problems when the centrifuge tube approaches and/or reaches its natural frequency or 'first whorl frequency'.

Ideally, the rotational speed of the shaft at its natural frequency or 'first whorl frequency' would be above the desired operational speed of rotation of the shaft or centrifuge tube, and the present invention seeks to provide a centrifuge having a shaft or centrifuge tube having this desirable characteristic.

According to the present invention there is provided a centrifuge including a non-rotatable containment vessel, a rotatable centrifuge tube within said vessel, an inlet assembly for dirty gas, an outlet assembly for clean gas, and an outlet assembly for dirty gas, said inlet assembly for the dirty gas and said outlet assembly for the dirty gas being located in close mutual proximity and at or towards one end of the centrifuge tube, the outlet for the clean gas being located at the opposite end of said centrifuge tube, the flow of gas entering the centrifuge tube being reversed within said centrifuge tube so as to increase the residence time of the dirty gas within said centrifuge tube, said centrifuge tube incorporating a high speed disc alternator and alternator cooling compressors, said inlet assembly and said outlet assemblies being split at various locations along their lengths and at right angles to their axes.

Preferably, the outlet assembly for clean gas will be a toroidal outlet assembly, and the centrifuge tube will be supported for rotation on spaced foil bearings.

The centrifuge tube will preferably be supported for rotation on at least two pairs of foil bearings, the foil bearings being located at predetermined spacings relative to each other and to the ends and centre of the centrifuge tube.

The centrifuge tube will preferably, but not exclusively, be rotated by an air driven turbine, the centrifuge tube being supported by thrust bearings in the vicinity of the turbine and the pairs of foil bearings being located at each side of the turbine.

Each pair of foil bearings will preferably be located with respect to the centrifuge tube between opposing side plates located relative to the centrifuge tube.

In order that the invention may be more readily understood, embodiments thereof will now be described, by way of example, reference being made to the accompanying drawings, wherein.

Figure 1:
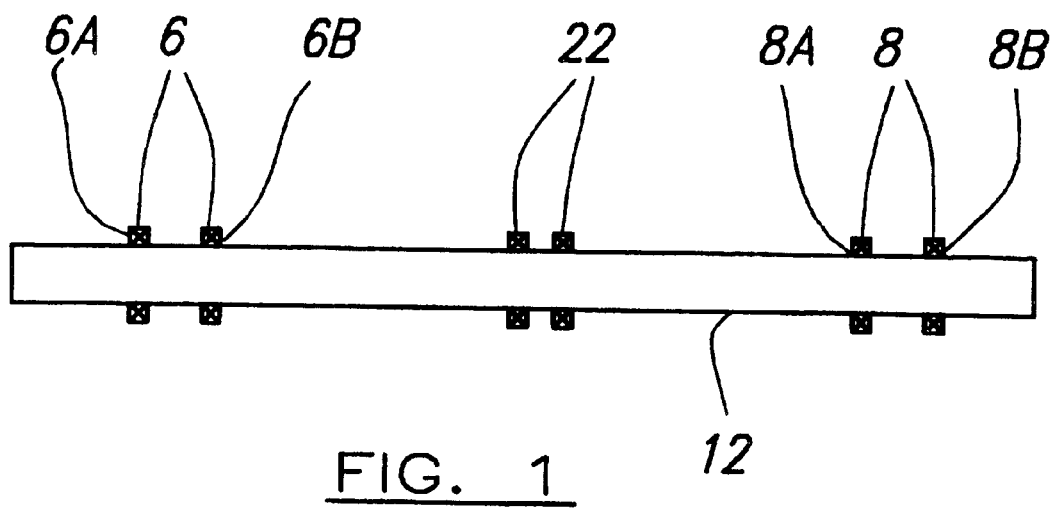
FIG. 1 is a schematic representation of a shaft which is supported in accordance with the invention.

Referring to the drawings and firstly to FIG. 1, there is shown a shaft 12 supported at its central position by thrust bearings indicated generally by reference numeral 22. Additional support for the shaft 12 takes the form of foil bearings, pairs 6 and 8 of such foil bearings being shown at either side of the thrust bearings 22.

The distance between the inner foil bearings of each pair of foil bearings 6 and 8 and the centre position of the shaft is variable within predetermined limits, as is the distance between the outer foil bearings of each pair and the extremities of the shaft. In addition, the distances between the bearings 6A and 6B of the pair of bearings 6, and the bearings 8A and 8B of the pair of bearings 8 are also variable, such variations determining the natural frequency or 'first whorl frequency' of the shaft.

Thus, by suitably arranging the positions of the pairs of foil bearings 6 and 8 relative to the central position and extremities of the shaft 12, the natural frequency or 'first whorl frequency' of the shaft may be varied to suit particular operational requirements of the shaft.

Figure 2:
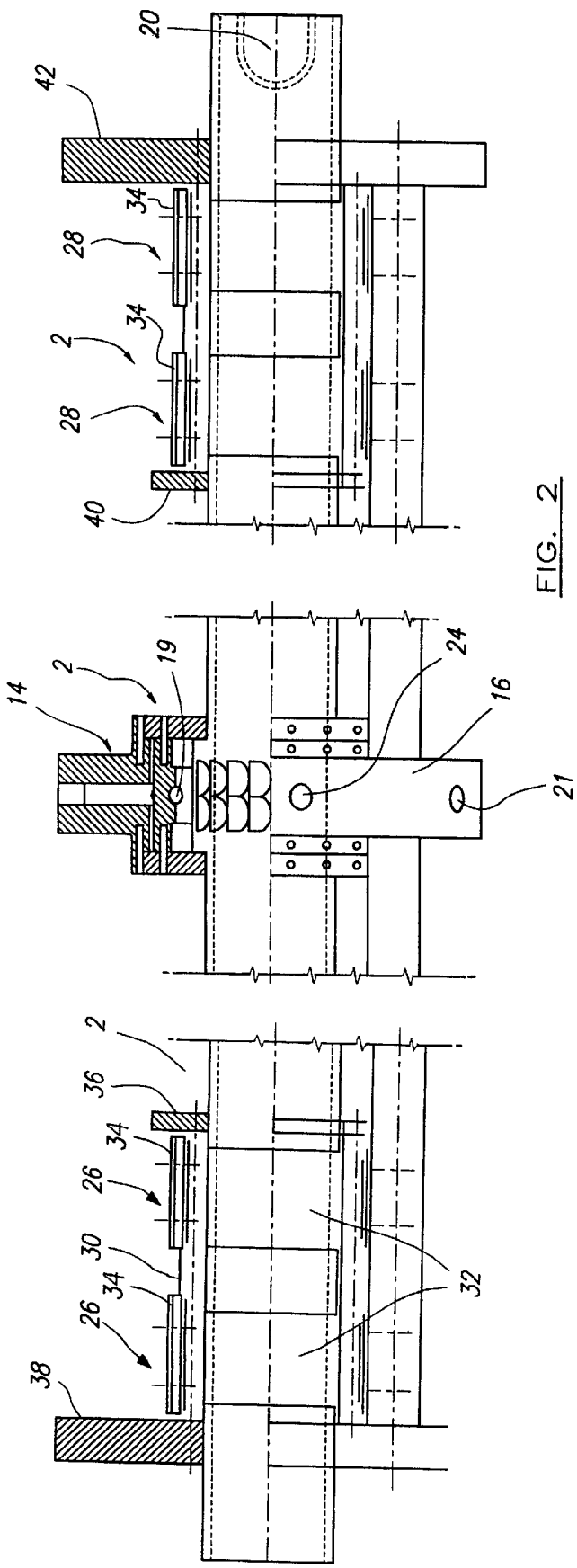
FIG. 2 is a longitudinal cross-sectional elevation of a centrifuge incorporating a centrifuge tube supported in in accordance with the invention.

Referring now to FIG. 2, which is a longitudinal cross-section of part of a centrifuge, the centrifuge is shown generally by reference numeral 2 and includes a central body, a centrifuge tube (shaft) 12, a turbine 14 in a turbine housing 16, and thrust bearings 22. The nozzle of the turbine 14 is indicated at 19, and turbine connections are shown at 21 and 24.

The centrifuge tube 12 which is adapted to be rotated by the turbine 14 is mounted for rotation in pairs 26 and 28 of triaxia copper-beryllium foil bearings located at each side of the turbine 14. Each pair of foil bearings consists of a carrier 30 for the foils 32, said foils 32 being held in position and at the correct tension by foil locks 34. As will be seen, the pairs 26 and 28 of the foil bearings are located between side plates 36,38 and 40,42.

The distance between the foil bearings of each pair of foil bearings 26 and 28 is variable, as is the distance between each pair of foil bearings. In addition, the distance between the outer foil bearing of each pair of foil bearings and the outer extremity of the respective end of the centrifuge tube 12 is variable, all these variations serving to determine and control the natural frequency or 'first whorl frequency' of the centrifuge tube 12 during operation of the centrifuge which, as mentioned earlier, will ideally be above the operational rotational speed of the centrifuge tube.

The above-described means to determine and control the natural frequency or 'first whorl frequency' of the centrufige tube 12 results in less vibration of the tube during operation of the centrifuge, and hence the centrifuge tube and other parts of the centrifuge are less likely to damage. The above-described means are able to accommodate large bearing deflections as the centrifuge tube 12 moves from sub- to super-critical speeds, whilst being of sufficiently low cost to enable efficient mass production to be achieved. In addition, the system enables high speed and long centrifuges to be realised at reasonable cost.

Where considered appropriate, it will be appreciated that the number of pairs of foil bearings supporting the centrifuge tube may be increased.

Figure 3:
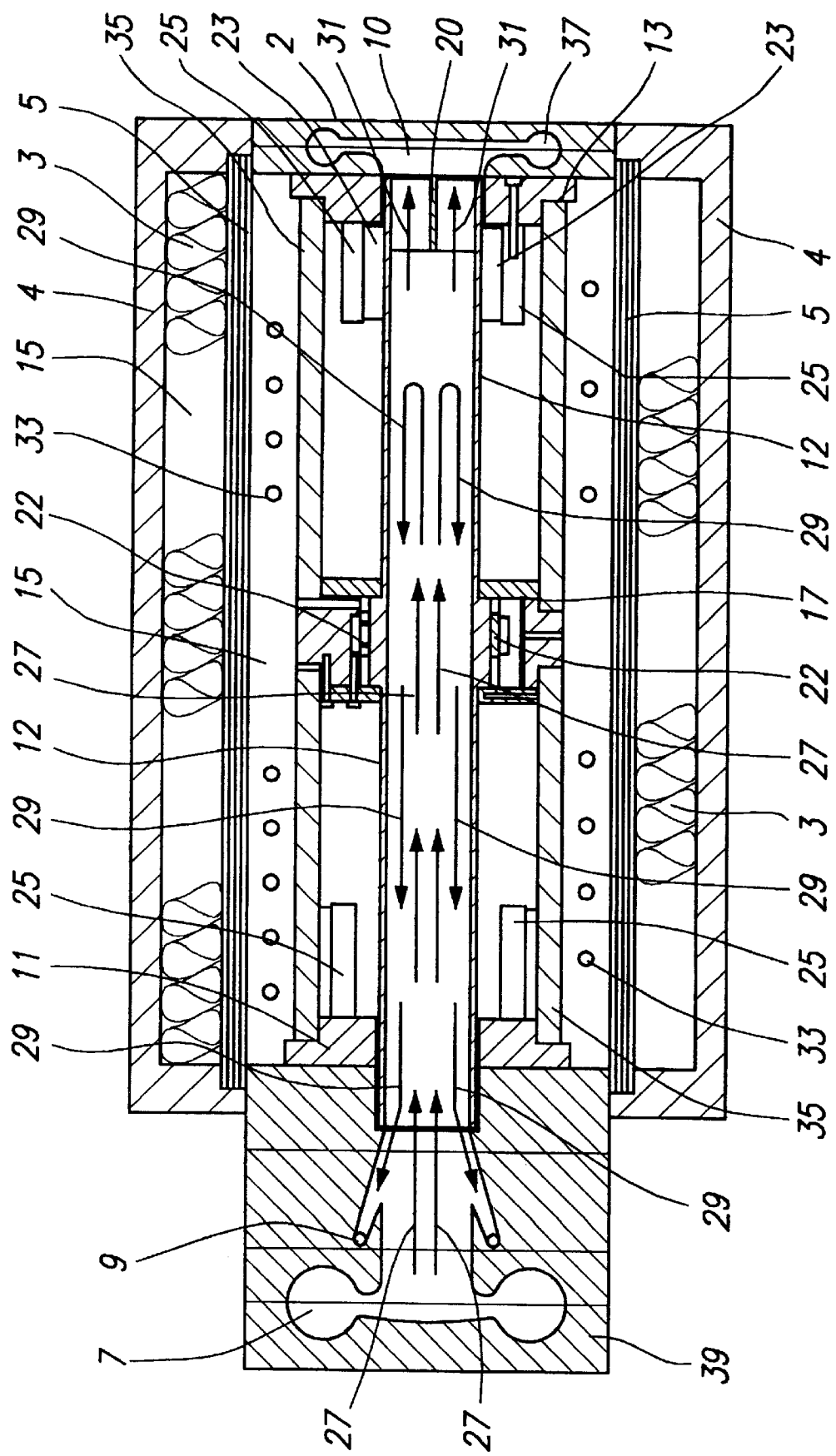
FIG. 3 is a longitudinal cross-sectional elevation of a centrifuge in accordance with the invention.

Referring now to FIG. 3, the centrifuge 2 comprises a non-rotatable containment vessel 4, an inlet assembly 7 for dirty gas, an outlet assembly 9 for dirty gas, and an outlet assembly 10 for clean gas, the inlet assembly 7 and the outlet assembly 9 being located in close proximity and at or towards the same end of the centrifuge. The outlet assembly 10 is located at or towards the opposite end of the centrifuge. In a modification or variation of the above, the inlet assembly 7 and the outlet assembly 9 may be duplicated at the other end of the centrifuge, so that there are inlet assemblies 7 and outlet assemblies 9 at both ends of the centrifuge.

The non-rotatable containment vessel 4 is located between and is supported by housings 11 and 13, and mounted for rotation within said vessel is a centrifuge tube 12 which communicates with the assemblies 7, 9, and 10 and which is driven or rotated by a compressed air turbine or other means indicated generally by reference numeral 17. Seals, not shown, are located between the centrifuge tube 12 and the assemblies 9 and 10. The centrifuge tube 12 includes a cruciform 20 which is rotatable with the centrifuge tube.

Located centrally of the centrifuge tube 12 so as to centrally support said centrifuge tube are thrust bearings 22, the centrifuge tube being additionally supported by foil bearings 23 at either side of the thrust bearings 22. These foil bearings are supported in housings (pillars) 25 carried by the housings 11 and 13.

An insulation jacket 3 is placed between the inner wall of the containment vessel 4 and an impact absorption layer 5, it being understood that the insulation jacket may be omitted if desired such that the space between the containment vessel 4 and the layer 5 is a void. The impact absorption layer 5 is provided to take the first impact of any explosion within the containment vessel should one occur.

FIG. 3 illustrates heating and cooling pipes or elements 33 which may be utilised to provide various levels of heating or cooling along the length of the centrifuge tube 12, i.e. cold at one end, hot at the other end, or a constant temperature throughout.

A cassette framework 35, which houses and supports the centrifuge tube 12, bearings and drive unit, is provided to facilitate easy removal of the moving parts of the assembly when maintenance is required.

The non-rotating assembly 39 has provision for inlet and outlet within the assembly, whilst the non-rotating assembly 37 can be utilised as an inlet or an outlet.

In operation, dirty gas to be treated is introduced into the centrifuge 2 through the inlet assembly 7 and thence into the rotating centrifuge tube 12 in the direction of arrows 27. Thereafter, the dirty gas comes in contact with the cruciform 20 or variable pitch turbine blades which, with the rotating centrifuge tube 12, reverses the direction of flow of part of the gas stream so that the gas flows in the direction of arrows 29 and is compacted due to the centrifugal forces towards the wall of the centrifuge tube 12. This reduces the pressure at the centre of the tube, i.e. along the axis of the tube, and increases the pressure at the wall region of the tube, thus allowing air (gas) to escape along the walls of the centrifuge tube 12 to exit through the outlet assembly 9.

Clean gas exits in the direction of arrows 31 through the cruciform 20 and outlet assembly 10.

Because, due to the presence of the cruciform 20, the gas flow is reversed within the centrifuge tube 12, the residence time of the dirty gas in the centrifuge tube 12 is increased, which consequently increases the efficiency of the centrifuge and hence the separation capabilities thereof.

Figure 4:
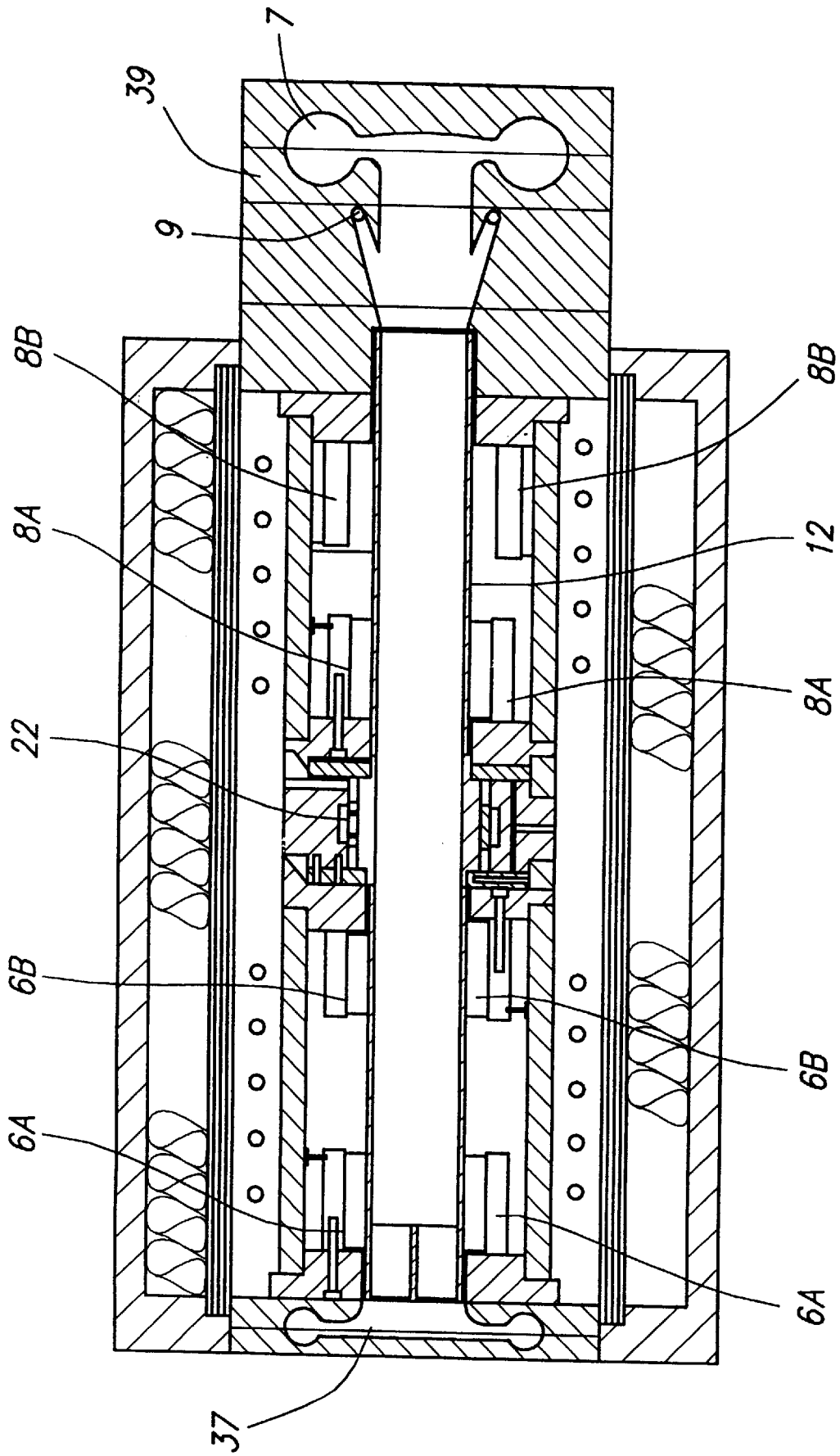
FIG. 4 shows a modification of the centrifuge of FIG. 3.

FIG. 4 illustrates two pairs of foil bearings 6A,6B and 8A,8B, i.e. substantially as illustrated in FIG. 1, it being appreciated that otherwise FIG. 4 is the same as FIG. 3. Alternatively, magnetic or other types of bearings may be used.

Figure 5:
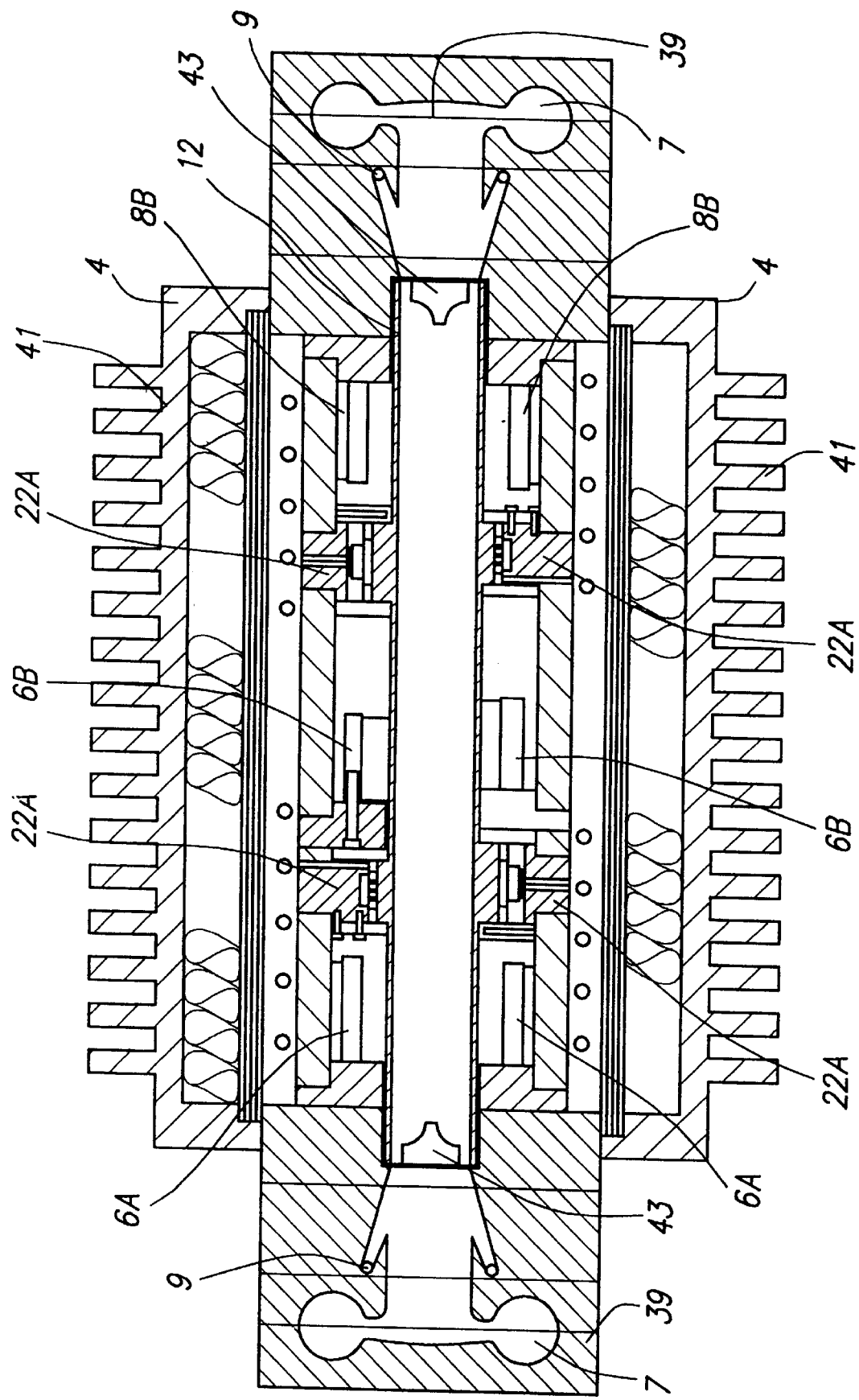
FIG. 5 shows further modifications to the centrifuge.

FIG. 5 shows a centrifuge having assemblies 39 at each end of the centrifuge tube 12. FIG. 5 also outlines the opportunity to utilise one or more drive positions 22A along the centrifuge tube 12 and to provide as many bearing locations as are deemed necessary. A cruciform 20 may be located at each end of the centrifuge tube 12, and as an alternative to the cruciform(s), variable pitch turbine blades 43 may be provided. In addition, cooling fins 41 may be provided as part of the monolithic construction of the non-rotating containment vessel 4.

Figure 6:
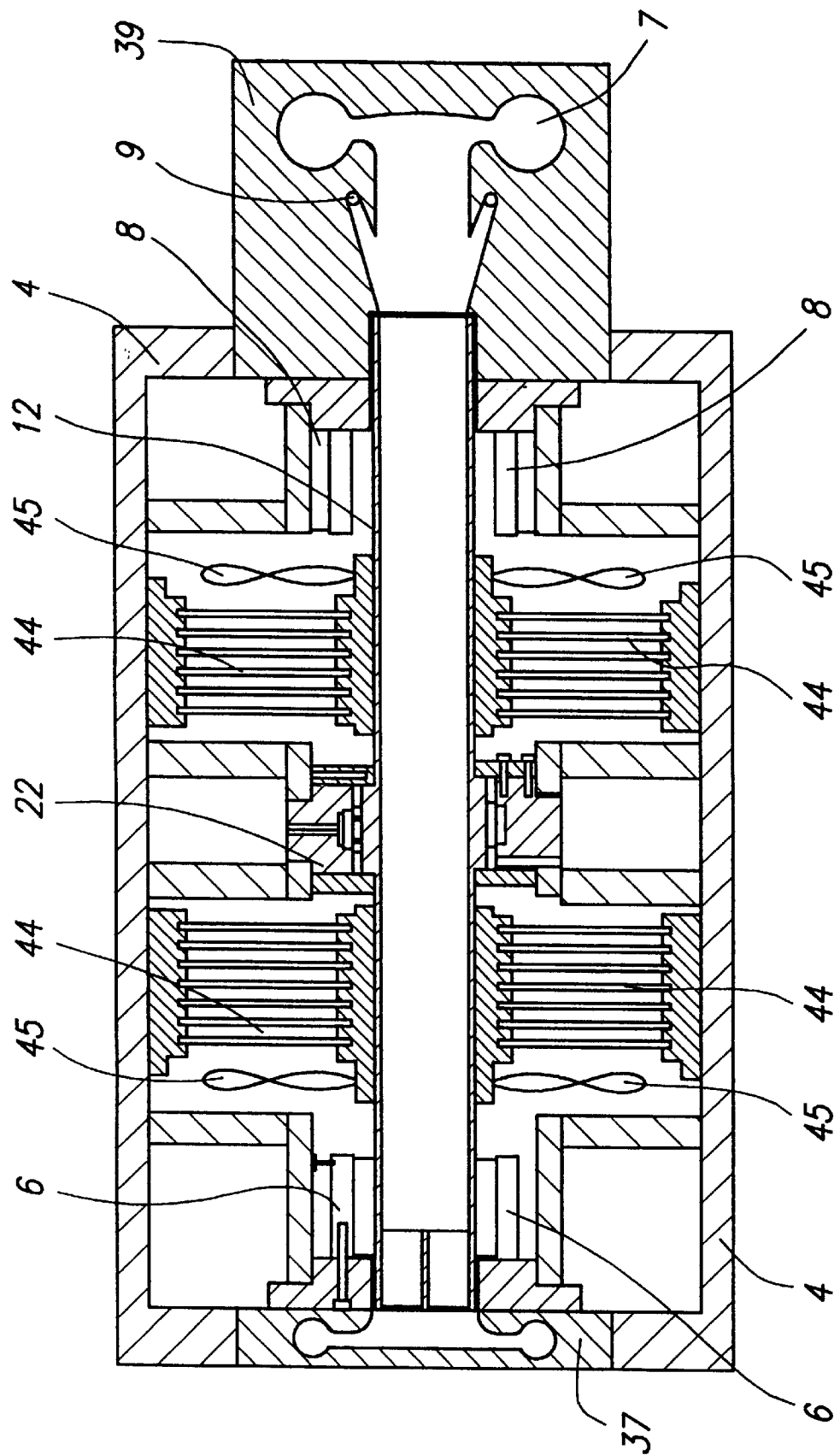
FIGS. 6 to 9 show yet further modifications or alternatives to a centrifuge in accordance with the invention.

FIG. 6 illustrates an alternative steam driven Pelton wheel system for use in high speed power generation systems. FIG. 6 illustrates a high speed disc alternator 44 and alternator cooling air compressors 45.

Figure 7:
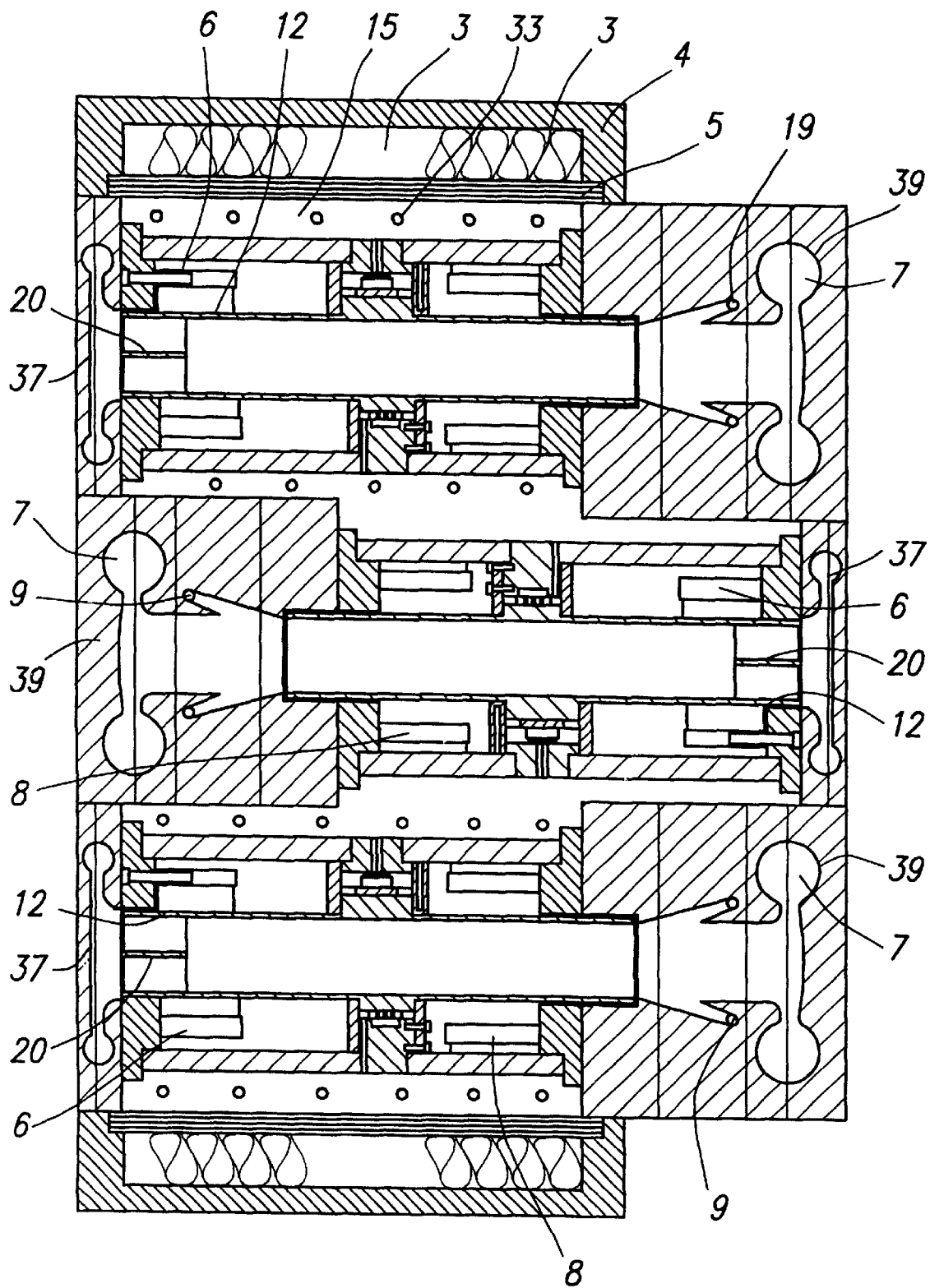

Turning now to FIG. 7, this illustrates a series of centrifuges in accordance with FIG. 3 in stack like form. The centrifuges illustrated in FIG. 7 will be of smaller dimension than the conventional centrifuges, and its purpose is that the smaller the internal diameter of the centrifuge tube 12, the more efficient the separation process. Therefore, a multiple stack is utilised so that a greater through-put is enabled to be separated. The configuration of these units may be also be in tandem form along one axis or in any other suitable configuration.

Figure 8:
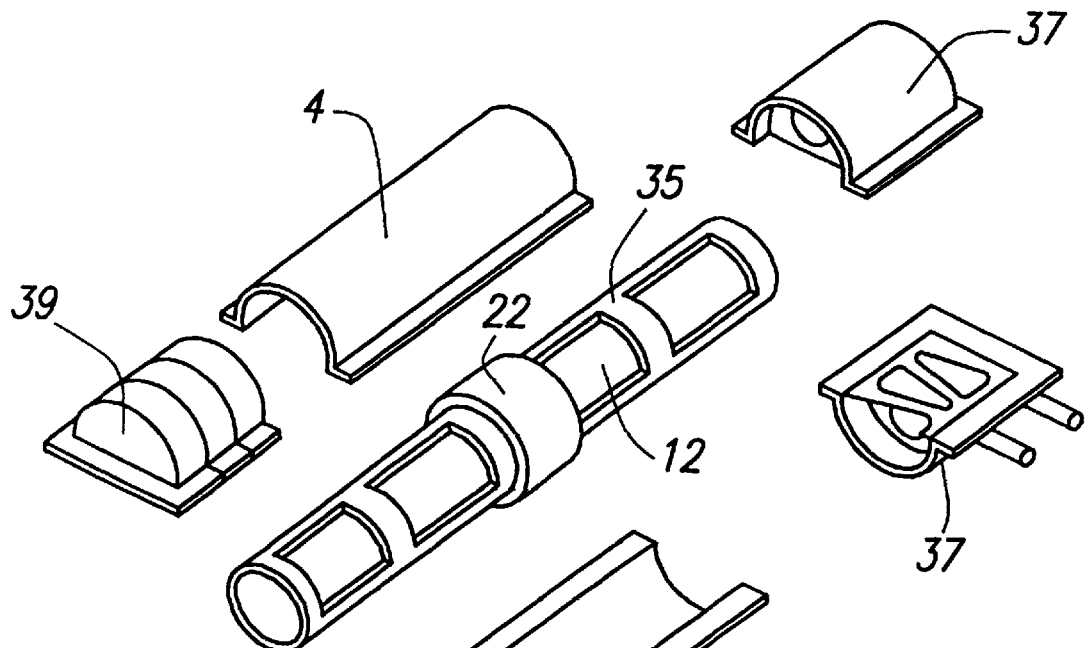

The containment vessel 4 is shown in general layout in FIG. 8 along with the assemblies 37 and 39, all of which have been split along the central axis of the centrifuge in order to facilitate easy access to the cassette 35 referred to with reference to FIG. 3. The assemblies 37 and 39 may also be split at various locations along their lengths and at right angles to their axis.

Figure 9:
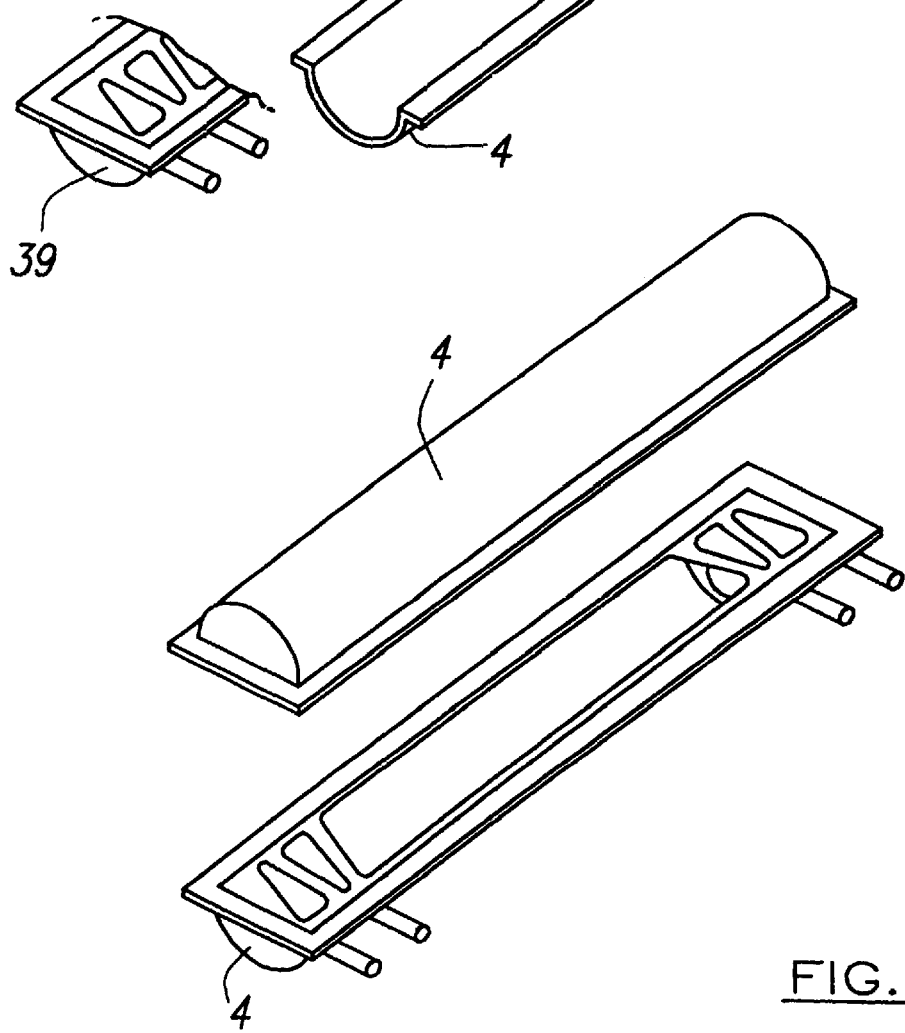

FIG. 9 illustrates a combined non-rotating containment vessel 4 and end assemblies 37 and 39 of monolithic form having a division or line of separation between the upper and lower portions along the axis of the centrifuge.

I claim:

1. A centrifuge including a non-rotatable containment vessel (4), a rotatable centrifuge tube (12) within said vessel, an inlet assembly (7) for dirty gas, an outlet assembly (10) for clean gas, and an outlet assembly (9) for dirty gas, said inlet assembly (7) and said outlet assembly (9) being located in close mutual proximity and at or towards one end of said centrifuge tube (12), the outlet assembly (10) being located at the opposite end of said centrifuge tube (12), the flow of gas entering the centrifuge tube (12) being reversed within said centrifuge tube so as to increase the residence time of the dirty gas within said centrifuge tube, characterised in that said centrifuge tube (12) incorporates a high speed disc alternator (44) and alternator cooling air compressors (45), and in that said inlet assembly (7) and said outlet assemblies (9,10) are split at various locations along their lengths and at right angles to their axes.

2. A centrifuge according to claim 1, characterised in that the outlet assembly (10) for the clean gas is a toroidal outlet assembly.

3. A centrifuge according to claim 1, characterised in that said centrifuge tube (12) is supported for rotation on spaced foil bearings (6,8), magnetic bearings or other means.

4. A centrifuge according to claim 3, characterised in that said centrifuge tube (12) is supported for rotation on at least two pairs of foil bearings (6,8), said foil bearings being located at predetermined spacings relative to each other and to the ends and centre of the centrifuge tube (12).

5. A centrifuge according to claim 4, characterised in that each pair of foil bearings (6,8) is located with respect to the centrifuge tube (12) between opposing side plates (36,38 and 40,42) located relative to the centrifuge tube (12).

6. A centrifuge according to claim 3, characterised in that said centrifuge tube (12) is supported at its central position by thrust bearings (22), the foil bearings (6,8) being located at each side of said thrust bearings (22).

7. A centrifuge according to claim 1, characterised in that said centrifuge tube (12) is driven by air turbine (14) or other means.

8. A centrifuge according to claim 1, characterised in that there are inlet and outlet assemblies (7,9) for dirty gas at each end of the centrifuge tube (12).

9. A centrifuge according to claim 1, characterised in that an insulating jacket (3) is located between an inner wall of said containment vessel (4) and an impact absorption layer (5) located within said containment vessel (4).

10. A centrifuge according to claim 1, characterised in that heating and cooling elements (33) are provided within said containment vessel (4) so as to provide various levels of heating or cooling along the length of the centrifuge tube (12).

11. A centrifuge according to claim 1, characterised in that said centrifuge tube (12), said bearings (6,8,22) and said alternator (44) and cooling air compressors (45) are housed in and supported by a cassette framework (35) to facilitate easy removal of the moving parts of the centrifuge when maintenance is required.

12. A centrifuge according to claim 11, characterised in that said inlet and outlet assemblies (7,9,10) are split along the central axis of said centrifuge to facilitate easy access to said cassette framework (35).

13. A centrifuge according to claim 1, characterised in that a cruciform (20) or variable pitch turbine blades (43) is/are provided within said centrifuge tube.

14. A centriguge according to claim 1, characterised in that cooling fins (41) are provided on the non-rotating containment vessel (4).

15. A centrifuge according to claim 1, characterised in that a plurality of said centrifuges are arranged in stack like or in tandem formation.

16. A centrifuge according to claim 1, characterised in that said non-rotating containment vessel (4) and inlet and outlet assemblies (7,9,10) are of monolithic form having a line of separation along the axis of the centrifuge to provide separable upper and lower portions.

* * * * *

UNITED STATES PATENT AND TRADEMARK OFFICE
CERTIFICATE OF CORRECTION

PATENT : 6,063,019
DATED : May 16, 2000
INVENTOR(S): Brian Wade

It is certified that error appears in the above-identified patent and that said Letters Patent is hereby corrected as shown below:

On the title page: Item [76] should read

"United Kingdom"

to

-- Channel Islands--

Signed and Sealed this

Twentieth Day of March, 2001

Attest:

NICHOLAS P. GODICI

Attesting Officer

Acting Director of the United States Patent and Trademark Office